Sept. 15, 1953  C. E. WILKEN ET AL  2,651,830
APPARATUS FOR FORMING BLOWER WHEELS
Filed July 17, 1947  6 Sheets-Sheet 4
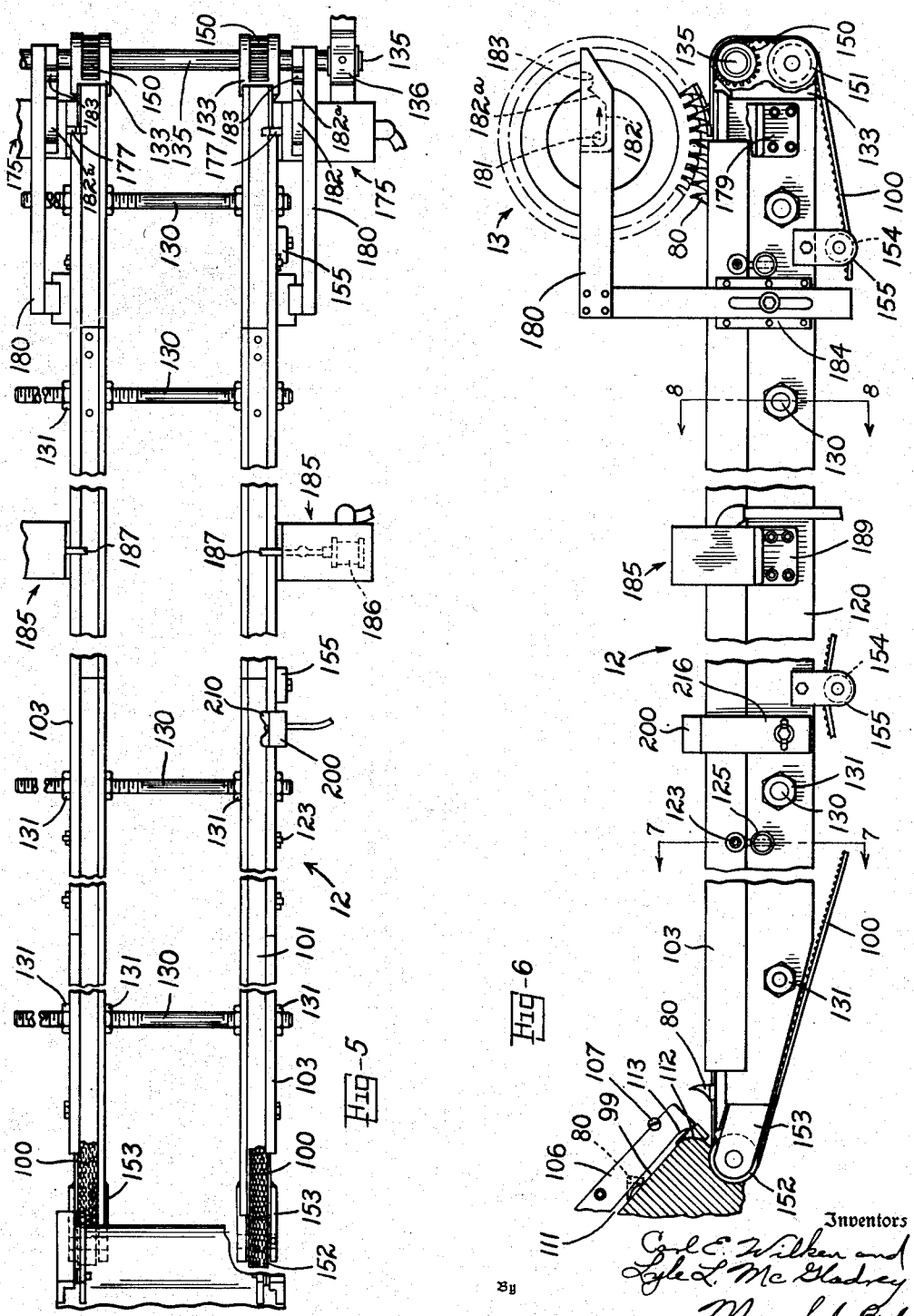

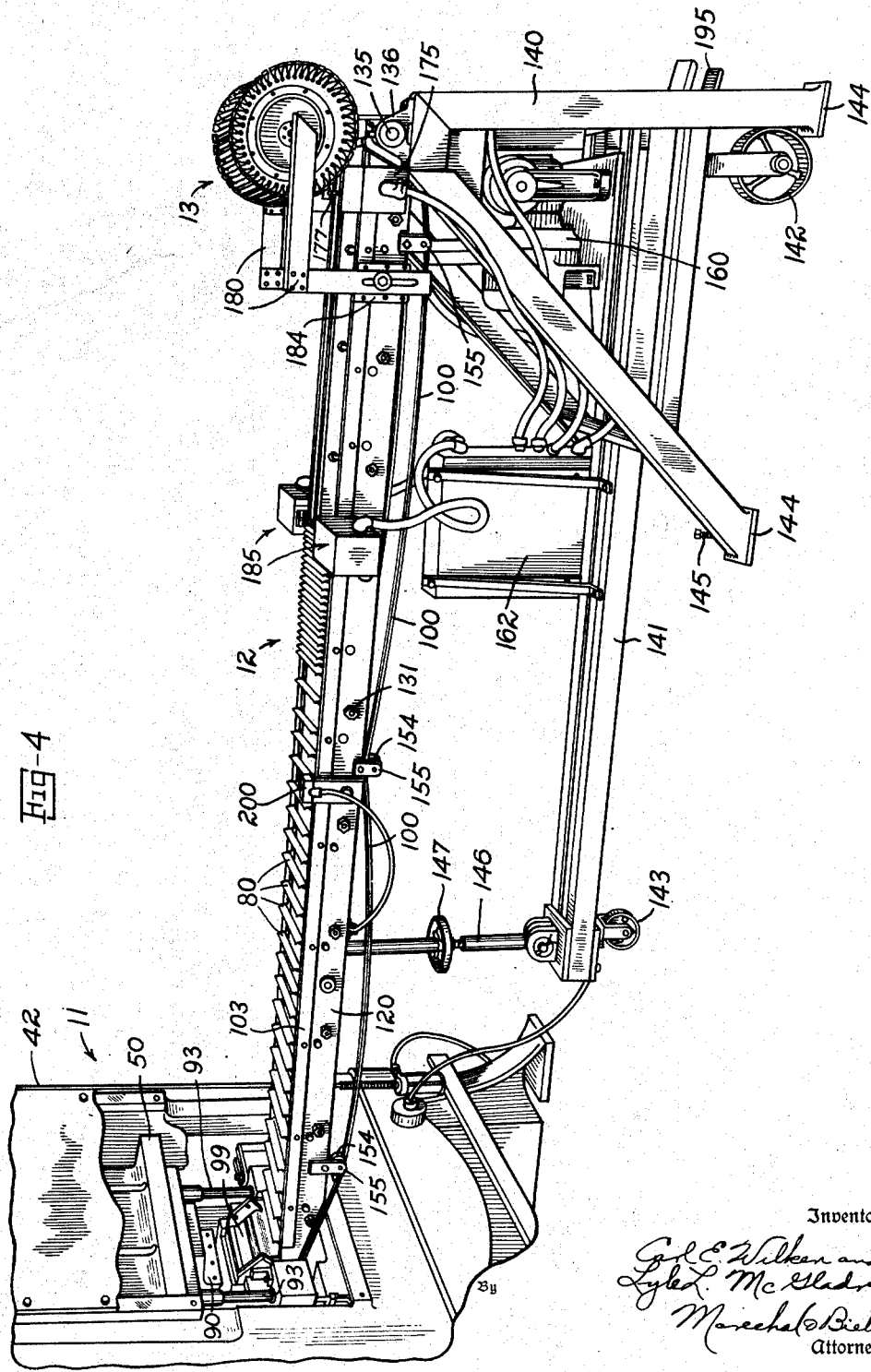

Sept. 15, 1953     C. E. WILKEN ET AL     2,651,830
APPARATUS FOR FORMING BLOWER WHEELS
Filed July 17, 1947     6 Sheets-Sheet 5
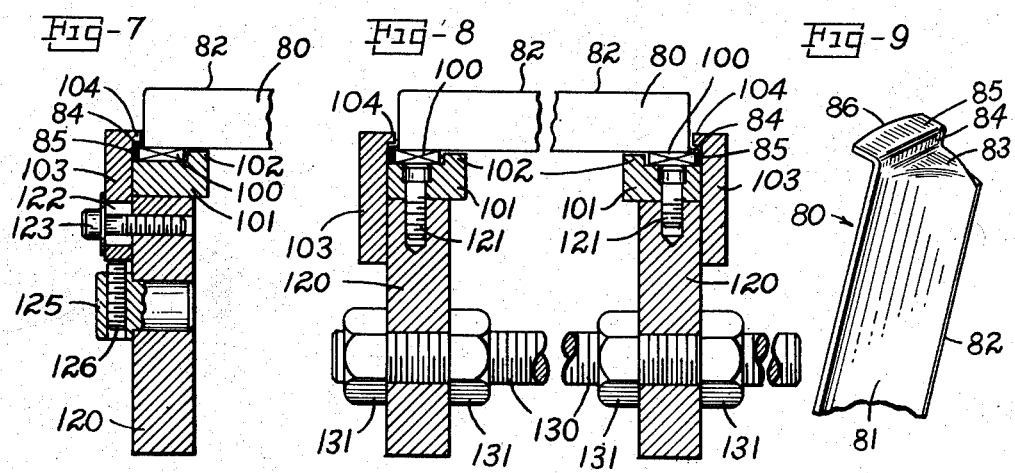
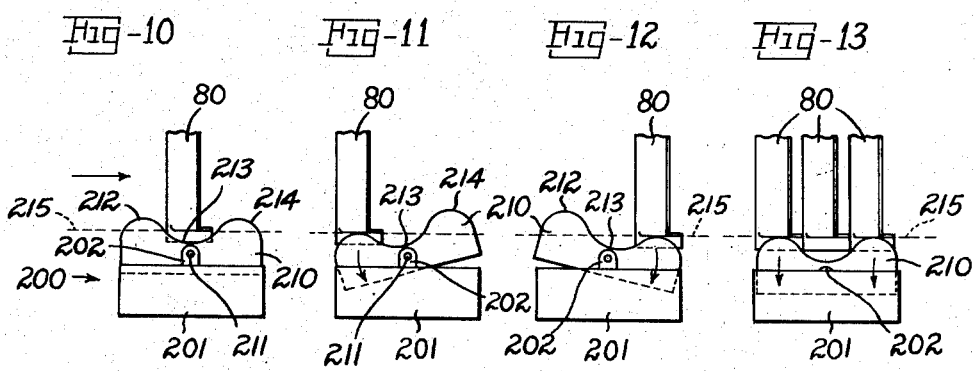
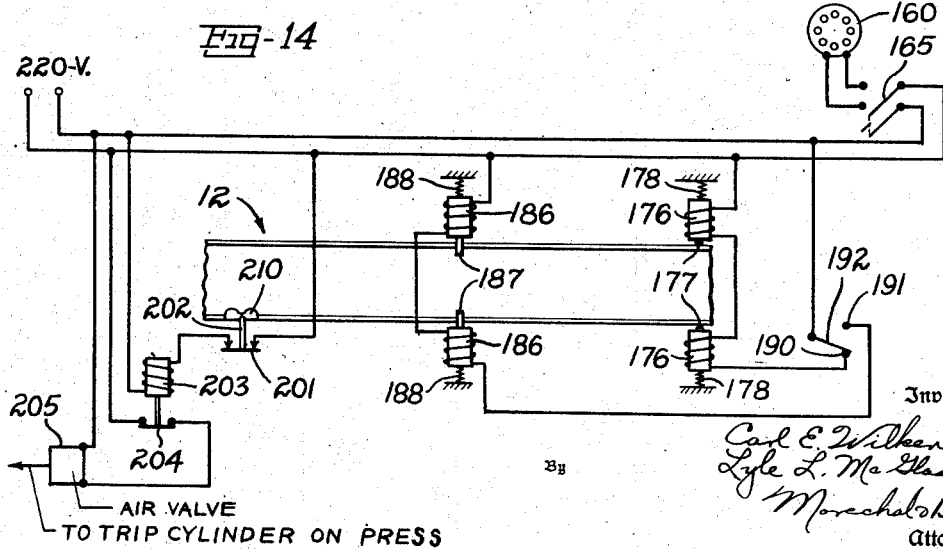

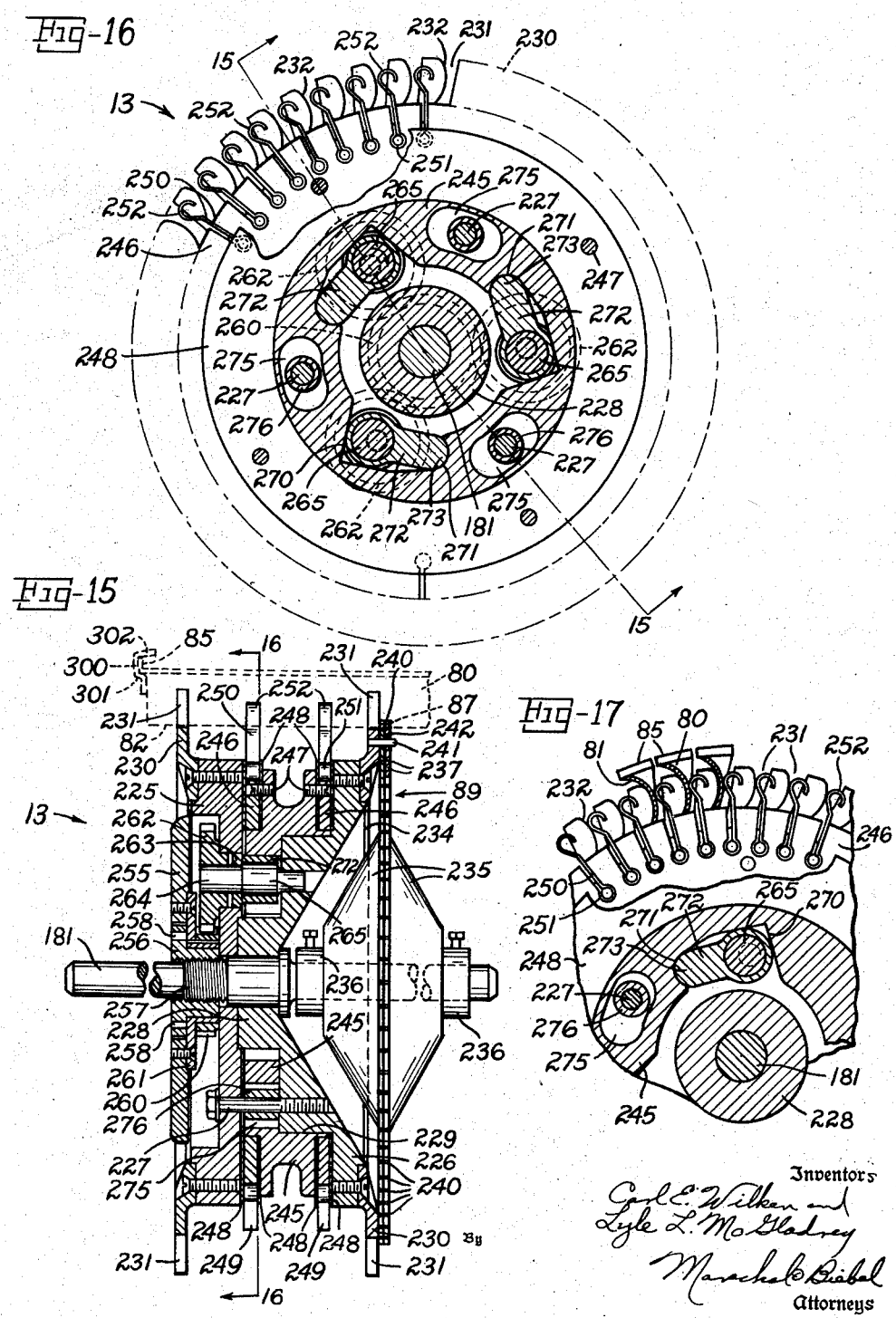

Patented Sept. 15, 1953

2,651,830

UNITED STATES PATENT OFFICE 2,651,830

APPARATUS FOR FORMING BLOWER WHEELS

Carl E. Wilken, Dayton, Ohio, and Lyle L. McGladrey, Cloquet, Minn., assignors to The Lau Blower Company, Dayton, Ohio, a corporation of Ohio Application July 17, 1947, Serial No. 761,476

8 Claims. (Cl. 29—23.5)

1

This invention relates to multiple blade centrifugal fans of the type commonly known as blowers, and more particularly to an apparatus for the fabrication of rotors or blower wheels for such blowers.

One of the principal objects of the invention is to provide apparatus for fabricating blower wheels by means of which the individual blower blades are successively formed, conveyed to an assembling station, and assembled and held in proper circumferential alignment about a central axis as a substantially continuous and rapid operation requiring minimum attention on the part of the operator.

Another object is to provide apparatus for fabricating blower wheels which includes a track arranged to convey individual blower blades to an assembling station in properly spaced relation for ready assembly in a holding fixture and to segregate the proper number of blades for the particular size of wheel to be formed while preventing interference with the assembling operation by other blades on the track.

An additional object is to provide apparatus for forming and conveying individual blower blades to an assembling station in spaced and guided relation such that the blades may be readily picked up in an assembling and holding fixture by simple rotation of the fixture relative to the moving blades without the necessity of individual handling of the blades.

Still another object is to provide apparatus of the above character wherein the track for conveying the blower blades to the assembling station also serves to guide the individual blades in proper cooperative relation with the assembling and holding fixture and is readily adjustable both horizontally and vertically to accommodate blades of the different lengths and different widths required for blower wheels of different sizes and capacity.

It is also an object of the invention to provide an assembling and holding fixture for use in the fabrication of blower wheels which is adapted to be mounted for rotation relative to a track for conveying individual blower blades to an assembling station and which is effective when rotated to pick up and hold the blades in proper circumferential alignment for the subsequent application of end rings thereto to complete the blower wheel.

Other objects and advantages of the invention will be apparent from the following description, the accompanying drawings and the appended claims.

2

In the drawings, in which like characters of reference designate like parts throughout—

Fig. 4 is a view in perspective of the conveying track and assembling fixture and also of a part of the blade forming mechanism of the apparatus;

Fig. 5 is a plan view of the conveying track;

Fig. 6 is a side view, partly broken away and in section, illustrating the conveying track and assembling fixture;

Figure 1:
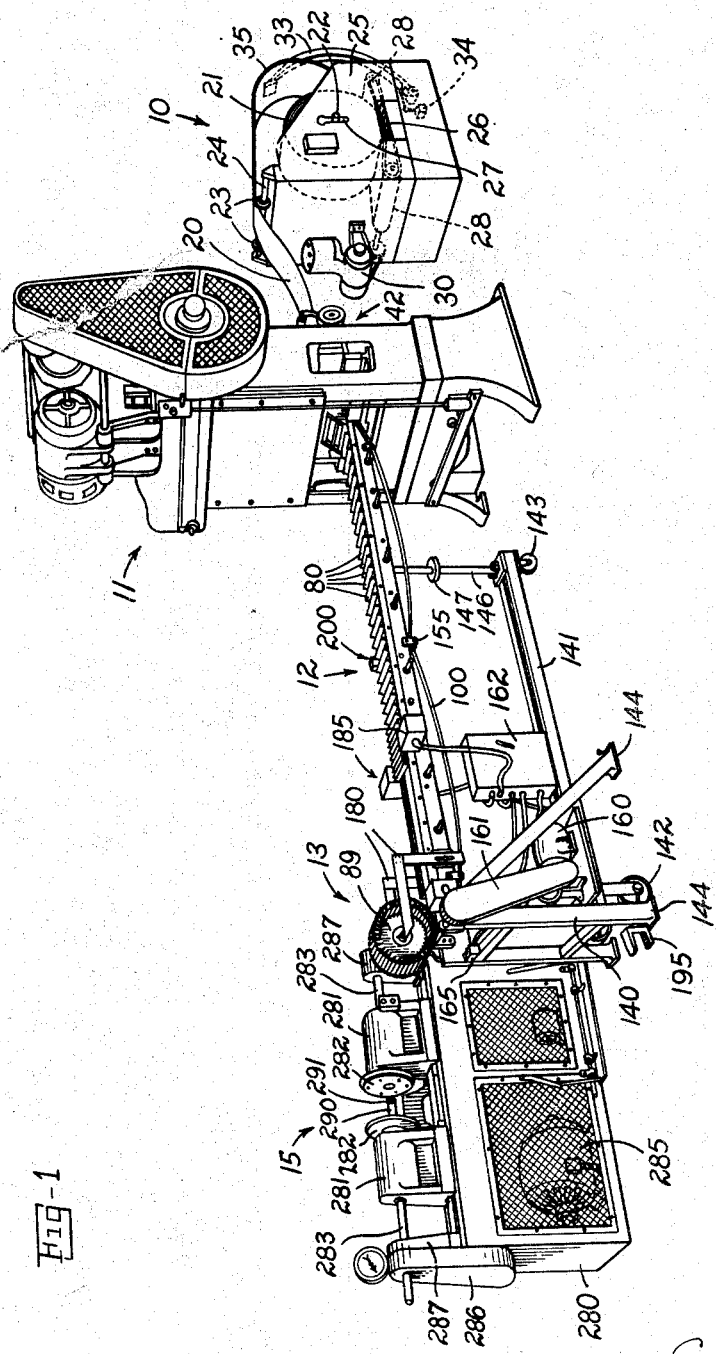
Fig. 1 is a view in perspective illustrating apparatus for fabricating blower wheels in accordance with the invention.

Figs. 7 and 8 are enlarged detail views taken in section on the lines 7—7 and 8—8, respectively, of Fig. 6;

Fig. 9 is a fragmentary view in perspective of a blower blade;

Figs. 10 through 13 are diagrammatic views illustrating in sequence the operation of the safety switch of the apparatus;

Fig. 14 is a wiring diagram;

Fig. 15 is a view in axial section of the blade assembling fixture of the apparatus, the view being taken substantially on the line 15—15 of Fig. 16;

Fig. 16 is a view in transverse section taken on the line 16—16 of Fig. 15, showing the fixture with its blade holding mechanism in relatively unlocked position; and Fig. 17 is a fragmentary view similar to Fig. 16 but showing the blade holding mechanism in relatively locked position.

Blower wheels of the type to which the present invention relates may be constructed from an integral sheet of material by stamping the blades from the sheet in the form of louvers, or the wheels may be assembled from a group of individual and separately formed blades which are then secured together in proper operative relation. The present invention is concerned with the latter type of construction, and particularly with the production of such blower wheels by simple, reliable and effective manufacturing operations at high speed and low unit cost. The invention provides apparatus and methods by means of which the individual blower blades for such wheels are blanked and formed from sheet stock and assembled and secured in a finished blower wheel in a substantially continuous operation requiring only general supervision and control by the operator. The assembling of the blades is carried out at substantially the same rate as the forming operation, and the apparatus of the invention is of such character as to minimize handling of the individual blades and to guide the blades automatically into proper position in an assembling and holding fixture or jig, thus providing for both rapid and accurate results.

In accordance with the invention, the individual blower blades are delivered directly from the forming part or station of the apparatus to a track which conveys them to an assembling station, and the blades and track include portions which cooperate to guide the blades in proper alignment and relative spacing for ease of assembly. At the assembling station there is mounted a fixture which is adapted for rotation relative to the moving track and thus for engagement with successive blades on the track, and this fixture includes gripping members for picking up the blades in proper circumferential alignment about a central axis and for holding the assembled blades in the desired proper positions. Thereafter, the end members for the finished wheel are applied to the ends of the assembled blades and secured in final position by means of a simple spinning operation, as described in the copending application of C. E. Wilken, Serial No. 635,454, filed December 17, 1945, and assigned to the same assignee as this application, now Patent No. 2,537,805, issued January 9, 1951.

The invention provides for a high degree of automatic control over the operation of this apparatus and method. The track is provided with releasable stops so arranged as to locate and hold the first advancing blade on the track in proper position to be picked up by the assembling and holding fixture, and additional stops are provided in adjustably correlated relation with the first stops to segregate the proper number of blades on the track for the particular wheel to be produced. These stops are interconnected in such manner that when the assembling operation begins, only the proper number of blades are conveyed to the fixture at the assembling station, and the remaining blades on the track are held back, thus both preventing interference by other blades with the assembling operation and also providing a time interval between assembling operations to permit the fixture which has been filled with blades to be removed from the track and replaced. A further stop is provided which is automatically effective to check the blade forming mechanism in the event of accumulation of blades on the track to an extent greater than desired, for example in the event of delay in exchanging fixtures or for any other reason, thus preventing the possibility of jamming of the apparatus by accumulated blades and assuring smooth all around operation.

Referring to the drawings, which illustrate a preferred embodiment of the present invention, Fig. 1 illustrates more or less diagrammatically complete apparatus for the fabrication of a blower wheel. As shown, the apparatus includes means indicated generally at 10 for providing a constant supply of sheet stock to a press 11 which in turn blanks and forms individual blower blades and delivers them to one end of a track indicated generally at 12. These blades are conveyed in guided and properly spaced relation to an assembling station at the opposite end of the track at which there is mounted a fixture or jig, indicated generally at 13, for picking up and assembling blades from the track, and adjacent the assembling station is provided a finishing device 15 for spinning end rings on the assembled blades held in the fixture. The track is so constructed and arranged that the blades reach the assembling station in the same relative alignment and spacing which they are intended to have in the finished wheel, and the fixture 13 includes angularly spaced gripping members such that when it is rotated relative to the track and the advancing blades thereon, it picks up successive blades and arranges them in the proper circumferential alignment about its axis of rotation.

The track also includes interrelated stops such that only the proper number of blades are conveyed to the assembling station for the particular size of wheel being produced, the remainder of the blades being held back at an intermediate station on the track. After the fixture has been filled with blades, the action of these stops is reversed to permit more blades to travel to the assembling station, and during the interval of travel of the first blade from the intermediate station to the assembling station, the filled fixture can be removed and a new fixture substituted. The filled fixture is then transferred to the finishing device where end rings are applied to the assembled blades and secured thereto by a spinning operation. During this operation, more blades are being assembled in the new fixture at the assembling station on the track, and this process can thus be carried on substantially continuously. The assembling fixture is of such construction that after end rings have been applied to the blades, it can be readily disengaged and withdrawn from the finished wheel and utilized again for assembling additional blades to form another wheel.

The sheet metal stock may be supplied to the blanking and forming press manually or as shown in Fig. 1 by mechanically operated supply means 10 of such construction as to maintain continuous pressure lengthwise of the stock as it is fed into the press. Referring to Fig. 1, it will be seen that the sheet stock 20 comes from a supply roll 21 which is provided with a central spindle or shaft 22, the sheet 20 being guided between collars 23 on a roller 24. The frame 25 of the supply unit forms a sort of cradle in which the supply roll 21 is supported on a relatively short conveyer belt 26, and the supply roll is held against horizontal movement by inserting the ends of the shaft 22 in vertical slots 27 at the sides of frame 25. The conveyer 26 is carried by rolls 28, one of which is in driving connection with a motor 30, and means are provided for causing intermittent operation of this motor 30 to drive the conveyer 26 and thus to cause unrolling of additional stock 20 from the supply roll 21.

Referring to Fig. 1, it will be seen that an arm 33 is mounted at the back of frame 25 and this arm is supported for swinging movement about an axis parallel to that of the supply roll. The arm 33 is provided with means such as a torsion spring urging it normally in the direction of the supply roll, and the lower end of the arm is adapted to actuate a switch 34 controlling operation of motor 30. The arrangement is such that when the arm is held away from the frame as a result of the presence of a substantial loop 35 of stock unrolled from the supply roll, the motor is shut off, but as the stock is used up in the press and the loop 35 is diminished in size, the arm swings forward and actuates the switch to start motor 30. The motor in turn drives conveyer 26, in counterclockwise direction as viewed in Fig. 1, thus unrolling more stock from the supply roll 21, and the slots 27 permit gradual lowering of the roll 21 in frame 25 as it unrolls. As the stock unrolls and thus increases the size of the loop 35, the arm 33 is swung back, to the right as viewed in Fig. 1, thus actuating the motor switch and stopping the motor. This construction thus provides for constantly urging the stock in the direction of the press 11 as a result of the spring tension in the loop 35 with substantially uniform pressure regardless of the amount of stock in the roll 21, and the automatic intermittent control of the motor in turn provides for maintaining this loop 35 of sufficient size to exert this desired pressure on the stock at the press. It will also be understood that the arm 33 can be adjusted relative to the motor switch to vary the angular position of the arm at which the motor is turned on, and thus to vary the size of the loop 35 in accordance with the pressure on the stock desired at the press.

The means for forming individual blower blades is shown in Fig. 1 as a press 11 provided at its front side with suitable blanking and forming dies and at its rear side with a feed mechanism arranged to receive the sheet stock from the supply means 10 and to advance it in a step-by-step feed to the dies. This feed mechanism is illustrated in diagrammatic detail in Fig. 3, and it includes a pair of feed rolls 40 and 41 mounted at the back of the press frame, which is designated generally at 42. These rolls are shown as provided with circumferential scoring to increase their frictional grip against the sheet, which is guided between the rolls by means of rollers 44 mounted on a bar 45 secured to the back of the press.

Figure 3:
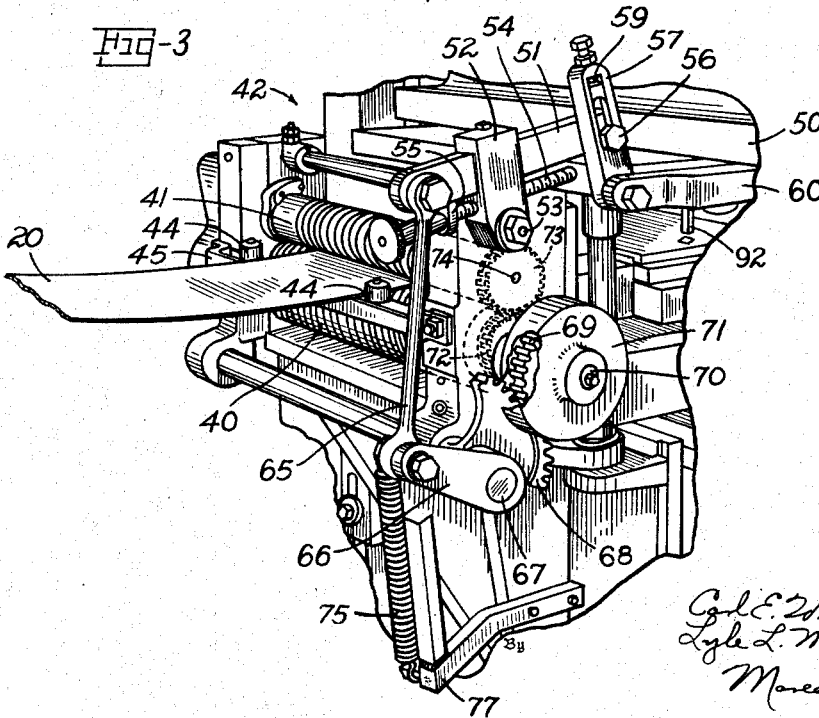
Fig. 3 is a fragmentary view in perspective illustrating the stock feeding mechanism of the apparatus.

A drive arrangement is provided for causing periodic rotation of the feed rolls 40 and 41 in timed relation with the reciprocal movement of the press slide 50. A lever 51 is mounted for sliding movement in a stirrup 52, which in turn is mounted for pivotal movement in the press frame about a stud 53, the relative positions of lever 51 and stirrup 52 being controlled by a hand screw 54 threadedly mounted in the stirrup and in a lug or ear 55 on lever 51. At its end nearest the press, the lever 51 is connected by means of a bolt 56 in a stirrup 57, which is mounted on an arm 60 secured to and extending rearwardly from the press slide 50. As shown in Fig. 3, the bolt 56 has limited sliding movement in the stirrup 57 under the control of an adjustable screw clamp 59.

At its outer end, the lever 51 is pivotally connected to one end of a link 65, the other end of which is pivotally connected to a lever arm 66 mounted on a rock shaft 67 carrying a gear segment 68. This segment 68 meshes with a gear 69 mounted on the shaft 70 of the feed roll 40. The gear 69 is secured to the shaft 70 by means of a ratchet or similar one-way drive connection 71, the arrangement being such that when gear 69 turns in clockwise direction as viewed in Fig. 3, the shaft 70 and roll 40 will rotate to advance the sheet, but when the gear rotates in the opposite direction, the shaft 70 and roll 40 will remain stationary. Another gear 72 is mounted on shaft 70 and meshes with a similar gear 73 mounted on the shaft 74 of feed roll 41 to cause the two feed rolls to rotate simultaneously and in opposite directions. A spring 75 is secured at one end to an arm 77 mounted on the press frame and at its opposite end to the lever 66 to take up loose play of the parts.

It will accordingly be seen that with the mechanism shown in Fig. 3, when the press slide 50 rises on its up stroke, it will act through arm 60 and stirrup 57 to raise the forward end of lever 51. The link 65 will be correspondingly lowered to rock lever 66 and segment 68 counter-clockwise, and this will cause clockwise feeding rotation of the feed roll 40 and similar feeding rotation of the feed roll 41 to advance the sheet stock 20. On the down stroke of the press slide, however, this action will be reversed but owing to the one way connection 71 between gear 69 and shaft 70, the feed rolls will remain stationary, thus holding the stock stationary for the proper blanking and forming operation at the front of the press. It will also be seen that the adjustable mounting of the bolt 56 in stirrup 57 and also the adjustable mounting of lever 51 in stirrup 52 provide ready control over the length of the lever stroke and hence the amount of rotation of the feed roll and the amount of stock fed forward on each feeding stroke.

It is believed that the operation of the blanking and forming parts of the press will be most readily understood in connection with a specific illustrative form of individual blower blade. Referring to Fig. 9, a typical blade 80 is shown as having a curved working face 81 which is arcuately shaped in a uniform manner over the major portion of the length of the blade, the edge 82 of this blade being adapted to lie innermost in the finished blower wheel. At either end, the wall of the blade is turned over at approximately right angles forming a laterally extending wall or flange 83 on the convex side of the blade. Beyond the wall 83 the material of the blade is bent outwardly at right angles to the longitudinally extending blade surface to form a flange 84 extending outwardly in the direction of the length of the blade. This flange 84 is in turn bent over to provide a further flange 85 which is generally parallel to the adjacent wall or flange portion 83 and may have its outer periphery 86 either flat or arcuate as shown, about a radius corresponding to the radius of the finished blower wheel. The blade edge 82 is preferably notched at its central portion as indicated at 87 in Fig. 2 for cooperation with a central disk 89 as shown in Fig. 15 and described in connection therewith. With the blades all die stamped and formed from a single continuous sheet of stock, a corresponding notch is formed on the opposite edge of the blades as shown at 88 in Fig. 2 but this latter notch is of no particular value so far as the operation of the device is concerned.

Figure 2:
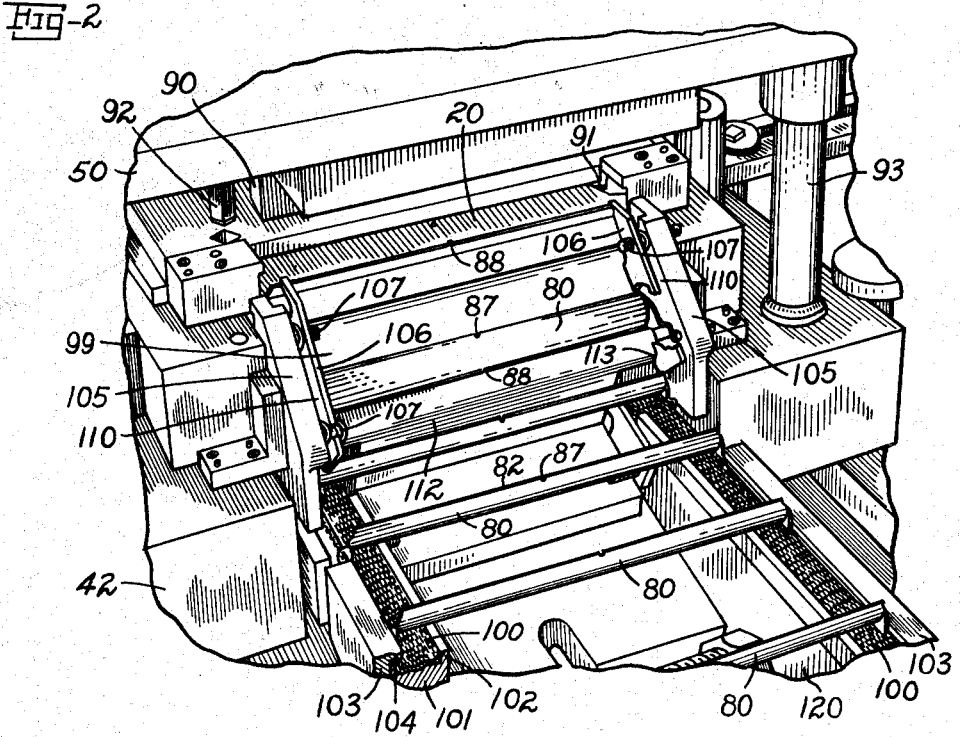
Fig. 2 is an enlarged fragmentary view in perspective illustrating the blanking and forming mechanism of the apparatus.

Now referring particularly to Fig. 2 and also to Figs. 4 to 6, the advancing edge of the sheet 20 is shown in Fig. 2 as in position for a cutting and forming operation of the press to produce a complete blade 80, and one such blade is shown in the process of delivery to the conveyer track. The forming die carried by the press slide 50 is indicated at 90 and it will be seen that a punching operation has already been carried out within the press to form the notches 87—88 in the blades, and also to blank out portions at the sides of the sheet as indicated at 91 in preparation for the subsequent forming of the flanges 83, 84 and 85. The usual pilot member 92 for accurately positioning the stock relative to the blanking and forming die is also shown in Figs. 2 and 3, and the telescoping guide units for the slide are shown at 93 in Figs. 2 to 4. It will be readily understood that in accordance with the conventional operation of such progressive dies, on each down stroke of the press slide 50, the proper amount of stock is cut off from the end of the sheet and formed into a blade, and simultaneously the punching operations are carried on at positions on the stock spaced within the press from the blanking and forming part of the die, these parts thus cooperating with the feed mechanism as described to provide for successive blanking and forming operations and the delivery of successively formed blades to the track.

At the front of the press and adjacent the lower die, there is provided a plane sliding conveyer member 99 which is arranged to deliver each blade as it is formed to the track 12 which in turn conveys it to the assembling station and the assembly fixture 13. As shown in Fig. 2, the track includes a pair of spaced, endless conveyer belts 100, shown as formed of chain mesh, supported in track members 101 which include upwardly extending flange portions 102 along their inner edges. The track members 101 are also provided with outer rails 103 having inwardly extending flange portions 104 which overhang the outer edges of the belts 100. The flanges 102 and rails 103 thus cooperate to form grooves for receiving belts 100, and they are spaced a sufficient amount to leave clearance between the outer edge of the belt and the rail 103 to receive the flanges 85 of the blades 80 as shown in Figs. 7 and 8. It will also be noted that the rails 103 terminate at points spaced from the ends of the track, which is so arranged, as shown in Fig. 6, that the lower edge of the conveyer member 99 overhangs the end portions of the track beyond the adjacent end of the flanged rails 103.

The conveyer member 99 includes spaced and vertically arranged side walls 105 to which guide plates 106 are secured in spaced relation by means of bolts 107 to leave vertical clearance slots 110 and horizontal clearance slots 111 as shown in Figs. 2 and 5. The spacing of the side walls 105 and guide plates 106 is so controlled that the formed blades 80 will have sliding clearance at their outer ends between the walls 105, and their flanged portions 83, 84 and 85 will similarly have sliding clearance in the slots 110 between each wall 105 and its adjacent guide plate 106. Similarly the main portions of the blades will have sliding clearance in slots 111 as shown in Fig. 6.

The operation of these parts in the guiding and delivery of blades 80 from the die to the track is illustrated in Figs. 2 and 6. After each successive blade is formed, it is pushed forward by the advancing stock to the upper end of the conveyer member 99 and slides by gravity down to the track. During this sliding movement the blade is guided with its length perpendicular to its direction of motion by the guiding fit of its flanged ends in the slots 110. Also the lower edge 112 of the part 99 is rounded as shown in Fig. 6, so that as each blade reaches this point, it rotates through approximately 90° in such manner that it is delivered to the track with its flanged portions 84 in position to ride on the upper surface of the belts 100, thus positioning its edge 82 uppermost as shown in Figs. 2 and 6 to 8. The lower edges of guide plates 105 are also curved as shown at 113 to aid in guiding this rotational movement of the blades into proper position on the track. In this position, the flange portions 85 of the blades extend downwardly to overlap the outer sides of the conveyer belts and thus cooperate in guiding relation with the belts to maintain the blades on the track parallel with each other and perpendicular to the length of the track as shown in Figs. 7 and 8. In addition, when each said blade reaches the end rails 103 on the track, the flanges 104 overhang the upper surfaces of the blade flanges 84 for further guiding action.

The construction and operation of the conveyer track is illustrated in detail in Figs. 4 to 8. As shown, each of the track members 101 which support the conveyer belts 100 is secured to one of a pair of supporting beams or bars 120 by means such as recessed bolts 121. The beams 120 also support the side rails 103, which are secured thereto for vertical adjusting movement to accommodate belts of different thickness. As shown in Figs. 6 and 7, each side rail 103 is provided with a vertical slot 122 which receives a bolt 123 set in the side of one of beams 120. A stud 125 is mounted below each bolt 123 in beam 120, and an adjusting screw 126 is threadely mounted in the head of each of these studs. With this construction, when bolts 123 are loosened, the height of rails 103 can be varied by means of the adjusting screws 126, and thereafter the rails are locked in adjusted position by retightening the bolts 123.

The track is mounted for movement towards and away from the press and also for vertical and lateral adjustment to accommodate blades of different lengths and widths. As shown particularly in Figs. 4 and 8, the two track beams 120 are secured together in adjustable parallel relation by means of bolts 130 and nuts 131, thus providing for varying the lateral distances between the conveyer belts 100 to receive and guide blower blades of different lengths. At the end of the track furthest from the press, the beams 120 are provided with brackets 133 in which is mounted a shaft 135 having its outer ends journaled in bearings 136 secured to a frame 140. This frame is in turn supported on a carriage 141 provided with a pair of wheels 142 at its end furthest from the press and with a single swiveled wheel 143 at its end adjacent the press. The frame 140 includes legs and feet 144 which may be secured in fixed position relative to the floor by means such as spikes or bolts as indicated at 145.

At its end adjacent the press, the track is supported above carriage 141 by means of jack 146 having an adjusting hand wheel 147, thus providing for angular adjustment of the track about the pivotal mounting of shaft 135 in bearings 136 to raise or lower the end of the track adjacent the press. It will be seen that the distance between the top of the track and the adjacent end of the sliding conveyer 99 is important in obtaining the desired positioning of the blades on the track as described in connection with Fig. 6, and that this distance will vary for blades of different widths. The jack 146 accordingly provides ready means for quickly adjusting the track height in accordance with the width of the particular blades to be produced.

Figs. 1, 5 and 6 illustrate the mechanism for driving the conveyor belts to impart the desired motion to the blades on the track. As shown, the brackets 133 are channel shaped, and a gear 150 is mounted on shaft 135 within the channel portion of each of these brackets. These gears 150 are formed for meshing engagement with the belts 100 to cause movement of the belts in response to rotation of shaft 135. Each bracket 133 also supports a guide wheel or roller 151 pivotally mounted below the gear 150 therein, and similar guide wheels 152 are mounted in brackets 153 at the ends of the beams 120 adjacent the press. Additional guiding and supporting action for the belts 150 is provided by rollers 154 mounted in brackets 155 secured in spaced relation along the lower edge of beams 120. As shown in Fig. 4, there are three of these rollers 154 for each belt 100, the belts being looped under the outer two rollers and over the inner roller.

Driving power for shaft 135 and the conveyer belts 100 is provided by means of a motor 160 mounted on carriage 141 and in driving connection with the shaft 135 through a sprocket or belt drive enclosed within the housing 161 as shown in Fig. 1. Carriage 141 also serves to support a transformer 162 which is connected with a suitable source of operating current and provides the current for motor 160 and for the electrically operated controls on the track. An operating switch for starting and stopping motor 160 may be mounted at any position convenient for the operator of the apparatus, for example, at 165 on the frame 140 as shown in Fig. 1.

Electrically operated stop means are provided at intervals along the track for controlling movement of the blades and especially for segregating from the advancing blades the proper predetermined number for the particular wheel being produced and holding back the remaining blades and preventing them from interfering with the assembling operation. Referring to Figs. 4 to 6, and also to the wiring diagram in Fig. 14, a pair of stops identified generally as 175 is positioned adjacent the outer end of the track and on opposite sides thereof. Each of these stops includes a solenoid 176 having its plunger 177 arranged to project inwardly of the track and into the path of blades thereon when its operating coil is deenergized but to be retracted out of the path of the blades when its operating coil is energized, this being conveniently effected by means of springs 178.

The stops 175 are mounted on the track, by means such as brackets 179 secured to beams 120, in predetermined spaced relation to the pair of arms 180 which support the assembling fixture 13. As shown in Fig. 6, these arms are provided with slots for receiving the supporting spindle 181 for the fixture, each of these slots including an elongated portion 182 and a semi-cylindrical portion 183 adjacent the outer end of the arm and spaced above the portion 182 and connected therewith by an inclined portion 182a. The stops 175 are so located with respect to arms 180 that when the solenoid plungers 177 are extended in operative position, they will stop the first blade on the track substantially directly below the axis of spindle 181 when the spindle is positioned at the innermost end of slot portions 182, and this first blade will thus be in proper position to be engaged by the fixture as shown in Fig. 6, the plungers 177 and arms 180 thus cooperating to define an assembling station for the blades on the track. It will also be noted that the arms 180 are mounted on the track by means such as brackets 184 providing for vertical adjustment of the arms to accommodate fixtures of different diameters used in assembling wheels of different sizes.

A second pair of stops 185 similar to the stops 175 is arranged on opposite sides of the track but spaced longitudinally from the stops 175, and each similarly includes a solenoid 186 having its plunger 187 arranged to project inwardly of the track and into the path of blades thereon when its operating coil is deenergized and similarly to retract from this operating position when its coil is energized, the plungers being provided with springs 188 as shown in Fig. 14. The plungers 187 are designed to operate in conjunction with the plungers 177 to segregate the proper number of blades on the track for the particular size of wheel being produced and to hold back the other blades on the track and so prevent them from interfering with the assembling operation. Accordingly, the brackets 189 for supporting stops 185 are adapted for mounting at different positions lengthwise of beams 120 in order to vary the spacing between plungers 177 and 187 and thus to provide for segregating different numbers of blades in the length of track between the plungers of the two pairs of stops.

The operating coils for the solenoids in the pairs of stops 175 and 185 are interconnected in the electric circuits of the apparatus in such manner that they are energized alternately, providing for advancing the plungers 177 into operating position when plungers 187 are retracted to their release positions and vice versa. Referring to the wiring diagram in Fig. 14, it will be seen that the current for energizing the solenoid coils 176 and 186 is controlled by a single pole double throw switch including terminals 190 and 191 and an operating lever 192, which is illustrated in Figs. 1 and 4 as operated by the foot treadle 195 at the outer end of the track. The arrangement is such that when the treadle 195 is depressed, it moves the switch lever 192 into contact with terminal 190, thus completing the energizing circuit through the solenoid coils 176 and causing the plungers 177 to be retracted. At the same time, this will open the circuit through terminal 191 and the solenoid coils 186, and the plungers 187 will accordingly be advanced into operating position as shown in the wiring diagram.

With the stops and their plungers in these relative positions, the plungers 187 will hold back the blades on the portion of the track between stops 185 and the press, while the blades between plungers 187 and 177 will advance on the track to be picked up in the blade assembling fixture. After all these blades have been assembled, treadle 195 is raised to reverse the circuits. The solenoid coils 186 will be energized to retract their plungers 187, but at the same time coils 176 will be deenergized and the plungers 177 will advance into position to stop the first of the advancing blades when it reaches the assembling station in proper position for the next assembling operation.

It will be seen, particularly as illustrated in Figs. 2 and 4, that the individual blades 80 are delivered to the track from the press at regularly spaced intervals. However, when one of these blades is stopped by either the stops 175 or 185, this blade in turn will stop the next advancing blade, and so forth. This result is highly advantageous so far as concerns the blades between the stops 175 and 185, since the construction of the individual blades, and particularly their end flanges, is such that when they are thus in abutting relation, they are automatically in the proper spacing to be picked up in the assembling jig. However, if the blades are allowed to collect on the track all the way back to its receiving end and the sliding conveyor 99, it will be seen that danger of jamming may result not only on the track but especially in the press itself. Accordingly, a safety switch is provided at a position spaced between the stops 185 and the press which is sensitive to the spacing between adjacent blades and which is effective to suspend operation of the press when this spacing is decreased below a predetermined minimum as a result of accumulation of blades on the track or for any other reason.

This safety switch is indicated generally at 200 in Figs. 1 and 4 to 6, and its construction and operation are illustrated more clearly in Figs. 10 and 13 and in the wiring diagram in Fig. 14. As shown, the safety switch unit 200 includes a microswitch 201 having an elongated operating button or plunger 202. The switch 201 is normally closed, as indicated in the wiring diagram, and it controls a circuit energizing the operating coil 203 of a solenoid relay to close switch contacts 204 in the operating circuit of an air valve 205. This valve 205 is in turn operatively connected as indicated in Fig. 14 to an air cylinder at the press 11, the arrangement being such that when the switch 204 is opened, the air valve 205 will actuate the air cylinder to shut off the press or otherwise suspend its operating movement, as by causing disengagement of its clutch.

The safety switch 200 is operated by a lever 210 pivotally mounted at 211 on the outer end of the switch plunger 202. The lever 210 is formed with a cam surface on its side facing inwardly of the track and including outer convex portions 212 and 214 and an intermediate concave portion 213. The lever is so positioned relative to the track that there is clearance between its middle cam portion 213 and the vertical plane of the outer ends of the blades on the track, but its outer cam portions 212 and 214 project across this vertical plane, which is represented by the dotted line 215 in Figs. 10 to 13. The mounting of lever 210 is such that it can be pivoted about its vertical axis 211 sufficiently to retract either of its cam portions 212 or 214 outwardly of this plane 215 without actuating switch plunger 202, but if both cam surfaces 212 and 214 are retracted outwardly of plane 215 at the same time, this will depress plunger 202 and thus open its switch contacts as indicated in Fig. 14.

The switch 200 is mounted between stops 185 and the press by means of a bracket 216, and its operation is illustrated diagrammatically in Figs. 10 to 13. When the apparatus is functioning in its normal manner, the blades 80 are delivered to the track at such intervals, as illustrated in Fig. 4, that the spacing between adjacent blades on the track is greater than the overall length of lever 210. Therefore, as each successive blade 80 reaches lever 210, it first engages cam portion 212 and rocks the lever sufficiently to move this cam portion out of its way as indicated in Fig. 11, this action taking place without operating movement of switch plunger 202. As the blade continues on the track, it moves opposite the concave cam portion 213 of lever 210, rocking the lever into a position of substantial parallelism with the track as shown in Fig. 10, and then it engages cam portion 214 and again rocks the lever to move this cam portion out of its way as shown in Fig. 12.

All of these movements take place without actuating switch 201 so long as the blades continue in such relative spacing that not more than one is in contact with lever 210 at any given instant. However, if the blades beyond lever 210 on the track are stopped, as by operation of stops 175 and 185 or for any other reason, they will begin to accumulate in abutting relation, and the construction of switch unit 200 is such that when this accumulation reaches lever 210, it will actuate switch 201 to cause stoppage of further operation of the blade forming mechanism. Referring to Fig. 13, it will be seen that the length of lever 210 is such that when the adjacent blades on the track are in abutting relation, one blade will be in contact with cam portion 214 at the same moment that another blade is in contact with cam portion 212. As a result, the lever 210 will be forced to move laterally against plunger 202, and will thus force the plunger to actuate switch 201 as shown in Fig. 13.

It will accordingly be seen that the switch 200 will operate automatically to check further operation of the blade forming means at the press whenever the spacing between adjacent blades on the track as they pass lever 210 is less than a predetermined minimum, which is substantially equal to the overall length of the lever. Switch 200 will thus prevent the blades from accumulating on the track to an extent capable of jamming the press, and it will operate with similar effectiveness if for any other reason the blades are spaced too closely on the track. For example, if the press should be operating at too rapid a rate as compared with the track speed, the switch 200 will be actuated, and the operator will thus be warned to reduce the press speed or increase the track speed, whichever is proper. It should also be noted that switch 200 does not require manual operation or reengagement. When the force causing accumulation of blades is relieved, as by release of stops 185, the blades operating lever 210 will move away on the track, and the lever will be free to return to its normal position shown in Figs. 5 and 10, thus automatically releasing plunger 202 and causing switch 201 to close and set the press again in operation.

The fixture 13 for assembling and holding the blower blades is illustrated in detail in Figs. 15 to 17. Referring to Fig. 15, this fixture includes a pair of circular body members 225 and 226 which are secured together as by means of bolts 227 and include coaxial central bores for receiving a mounting spindle 181. The body member 226 also includes on its inner side a cylindrical portion 228 of relatively small diameter which abuts the adjacent surface of body member 225, leaving a hub portion 229 of member 226 intermediate the axially outer ends of the fixture.

Each of the body members 225 and 226 has bolted or otherwise secured thereto one of a pair of circular disks 230 as shown in Fig. 15. Each of these disks 230 is formed with a plurality of angularly spaced slots in its periphery, these slots being arranged generally radially of the disk and being adapted to receive the edges 82 of the blades 80. As shown particularly in Figs. 16 and 17, one edge 232 of each slot 231 is arcuately curved about substantially the same radius as the working face 81 of each blade 80, thus providing for engagement between this edge 232 and the working face of a blade positioned in the slot 231. It will be understood that the disks 230 are so arranged that the slots 231 in each thereof are substantially directly in line with each other.

The body member 226 is formed on its axially outer side with a frusto-conical cutout portion 234 to receive a similarly shaped hub portion 235 of a center disk 89, which may be mounted on spindle 181 as shown in Fig. 15, the cutout portion 234 being of sufficient depth to receive the locking collar 236 of disk 89. Fig. 15 shows disk 89 as composed of a pair of duplicate members 237 assembled in face-to-face relation with their respective hub portions 235 outermost, and it will also be noted that each of these members 237 is provided with a series of peripheral notches 240 which are adapted for engagement with the notches 87 in blade edges 82 to assure proper relative spacing of the blades in the finished wheel. There are accordingly the same number of notches 240 in each member 237 as there are slots 231 in disks 230, this number being equal to the number of blades to be assembled in the finished wheel. In order to index the disk 89 with respect to the disks 230 so that the slots 231 and notches 240 will all be in proper alignment, a pin 241 is mounted in the disk 230 which is secured to body member 226, and this pin engages in a receiving hole 242 in each of members 237 as shown in Fig. 15. The holes 242 are so located with respect to the notches 240 in members 237 that when pin 241 is engaged therein, the notches 240 will be properly aligned with the slots 231 in disks 230 to receive the edges 82 of blades 80 set in the slots 231. It is accordingly unnecessary to secure the disk hubs 235 to spindle 181, since the pin 241 keys disk 89 to the fixture and maintains these parts in proper alignment throughout the blade assembling operation.

The dimensions of the fixture, and particularly of disks 240 and the slots 231 therein, are preferably such that when blades are fully inserted in all of slots 231, they will occupy the same relative positions as in the finished wheel. Accordingly, the fixture is provided with resilient means for holding blades firmly but yieldingly within these slots. As shown in Fig. 15, an annular member 245 is mounted intermediate slotted disks 230 for rotation on the hub portion 229 of body member 226. The member 245 carries on either side thereof one of a pair of annular disks 246, which are shown as secured to member 245 by means of bolts 247, and annular spacers 248 are provided between each disk 246 and the adjacent portions of members 225, 226 and 245. The disks 246 are formed with radial slots 249 arranged about their peripheries, these slots being the same in number and angular spacing as the slots 231 in disks 230 and the notches 240 in the central disk 89. Each of the slots 249 is adapted to receive and hold a spring member 250, which includes a loop 251 at its inner end which engages in the complementarily shaped inner portion of slot 249 and is thereby held against radial movement, these springs being held against movement axially of the fixture by the portions of member 245 which overlap the body member 225 and 226 as shown in Fig. 15. The springs 250 extend radially outwardly from the disks 246 into overlapping relation with the slots 231 in disks 230, and the outer end of each spring 250 is formed in a blade engaging loop 252 as shown in Figs. 16 and 17.

Means are provided for causing controlled rotation of member 245 with respect to the body members 225 and 226 and for thus causing movement of springs 250 relative to slots 231 to vary the pressure of the loop portions 252 of these springs on blades positioned in the slots 231. Referring first to Fig. 15, a hub member or hand wheel 255 is mounted on spindle 181 by means of a shouldered clamp nut 256, this portion 257 of the spindle being threaded and the clamp nut 256 being provided with socket holes 258 for receiving a suitable spanner wrench for adjusting purposes. The hand wheel 255 has a gear 260 secured thereto, as by means of a flange 261 bolted to the hand wheel as shown in Fig. 15. This gear 260 meshes with a plurality of gears 262 which include collar portions 263 journaled in angularly spaced holes in the body member 255, there being three of these gears 262 as shown in Fig. 16. Each gear 262 is pinned or otherwise secured to a stud 264 which includes an eccentric cam portion 265 integrally formed thereon or otherwise secured thereto. This construction thus provides for causing rotation of the stud 264 and cams 265 in response to rotation of hand wheel 255, and the outer surface of the hand wheel is preferably knurled or otherwise treated to facilitate manipulation thereof.

The studs 264 are so proportioned and arranged that their cam portions 265 lie within the open center of the intermediate member 245. This part of member 245 is formed as shown in Fig. 16 with three radially extending recessed portions, each of which includes a right angled wall portion 270 and a semi-cylindrically curved wall portion 271. The center axis of each stud 264 lies near and approximately equidistant from the wall portions 270 of one of these recesses in member 245, and each cam 265 has mounted thereon an eccentric strap 272 which includes an arm portion having a rounded end 273 adapted to engage the opposite cylindrical wall portion 271. Member 245 is also provided with elongated slots 275 positioned between the recesses 270—271 to receive bolts 227, spacers 276 being provided on these bolts 227 as shown.

The operation of these parts for varying the pressure of springs 250 on blades positioned within slots 231 is illustrated in Figs. 16 and 17. Fig. 16 shows the relative positions of the parts in the release position, which is the position of minimum pressure by the springs. It will also be noted that Fig. 16 shows one limit position of rotational movement of cams 265, since the eccentric straps 272 are in abutting contact with right angled walls 270 and thus are prevented from further rotation in counterclockwise direction as viewed in Fig. 16. With the cams in this position, it will be seen that intermediate member 245 is similarly at its limit of clockwise rotation relative to members 225 and 226 as viewed in Fig. 16, and that springs 250 accordingly have their outer loop portions 252 spaced angularly from adjacent walls 232 of slots 231. In this position, therefore, springs 250 exert minimum force on blades within slots 231, providing for ready relative disengagement between such blades and the fixture.

Fig. 17 illustrates the fixture parts in the other limit position of rotational movement of cams 265, i. e., their limit of clockwise rotation as viewed in Fig. 17 from the position shown in Fig. 16. It will be seen that during such rotational movement of the cams, the rounded ends 273 of eccentric straps 272 rock in the cylindrical wall portions 271 and exert thrust on these wall portions, thus causing the intermediate member 245 to rotate in counterclockwise direction as viewed in Figs. 16 and 17 and to carry springs 250 to the positions shown in Fig. 17, wherein each loop portion 252 closely approaches or passes the adjacent slot wall 232. It will also be understood that this rotation of the cams is obtained by rotating hub 255 on spindle 181, which movement is transmitted through gear 260 to the gears 262 on the studs 264 which carry cams 265.

When the parts are in the positions shown in Fig. 17, the loop portions 252 of springs 250 will exert yieldable resistance to the entry of the blade edges 82 into slots 231, but after this resistance has been overcome and the blades inserted in the slots, the springs will similarly exert substantial resistance to their withdrawal from the slots. As shown in Fig. 17, the springs opposite slots into which blades 80 have been inserted are deformed such that they bear against the blades and thus exert tension circumferentially of the fixture forcing the blade faces 81 against the slot walls 232 and holding the blades in the slots.

Fig. 17 accordingly shows the fixture in proper adjustment for picking up and assembling blades. Referring to Fig. 6, when the fixture spindle 181 is mounted in the slots 182 in arms 180 and caused to rotate, in counterclockwise direction as viewed in Fig. 6, at a peripheral speed substantially equal to the rate of travel of belts 100, the successive slots 231 in the fixture will come into register with successive blades 80 on the track, and these blades can thus be readily forced into the slots against the resistance of springs 250 and held therein. The blades will thus be successively picked up, as shown in Fig. 6, until the fixture is filled with the proper number of blades, which will occupy in the fixture the same relative positions as in the finished wheel and will have the flange portions 85 thereon forming semi-continuous flanges projecting radially outwardly as shown in Fig. 4, and also in Figs. 15 and 17. Also the blades will be properly indexed with the notches 240 in center disk 89, as a result of the indexing action of pin 241 and holes 242 as described. In order then to complete assembly of the wheel, end rings are applied to these blade flanges by means of the spinning device 15 shown in Fig. 1.

Referring to Fig. 1, the spinning device includes a frame 280 on which two hydraulically operated rams 281 are mounted for reciprocating movement towards and away from each other on substantially the same axis. Each of these rams carries a wheel 282 mounted for rotational movement on a shaft 283, and a motor 285 for rotating these shafts is indicated within the frame 280, the drive being transmitted from the motor through belts or sprockets within the housings 286 and uprights 287. A third ram is mounted on frame 280 for reciprocating movement radially of the axis of shafts 283, and it carries a spinning head 290, each end of which is provided with a spinning element such as a roller bearing 291.

In the use of this apparatus, an end ring of the proper diameter is mounted on each of the wheels 282 for example by means of small permanent magnets mounted at angularly spaced intervals about the inner surfaces of the wheels 282. End rings suitable for this purpose are shown and described in detail in the above noted application Serial No. 635,454, and one such ring is illustrated diagrammatically at 300 in Fig. 15. As shown it includes an offset shoulder portion 301 and an outer flange portion 302 adapted to overlap and overhang the flanges 85 of the blades assembled in a fixture.

When the proper number of blades have been assembled in the fixture as described, the filled fixture is transferred to the spinning unit, and the hydraulic rams 281 are actuated to clamp the fixture with the end rings overhanging the blade flanges 85 as described and shown in Fig. 15. Motor 285 is then operated to rotate shafts 283, and hence the wheels 282 and fixture clamped therebetween, and the third hydraulic ram is caused to move the spinning head 290 radially against the wheel. During this operation, the spinning members 291 cause the flanges 302 of the end rings to fold inwardly into overlapping and locking relation with the flanges 85. The spinning operation also tends to increase the spring tension of the blades within the fixture, thus offering substantial resistance to release of the cams 265 and their associated parts. Therefore, the fixture may be released by means of a spanner wrench applied to the holes 258 in the clamp nut 256, after which the fixture can be withdrawn axially from the blades to leave a finished wheel ready for balancing and any other desired tests.

It will accordingly be seen that the present invention provides an apparatus and a method by means of which the individual blower blades for a centrifugal blower wheel are successively formed, conveyed to an assembling station, assembled and held in proper circumferential alignment about a central axis and then provided with end rings for holding the assembled blades permanently in position to complete the blower wheel. In a typical work operation, the supply means 10 and the press are set in operation to form and deliver successive blades to the conveyor track, and an empty fixture 13 and a pair of center disks 89 are assembled on a spindle 181 and mounted in the slot portions 183 in bracket arms 180 at the assembling station of the track, with springs 250 of the fixture locked in their gripping positions shown in Fig. 17. Also, the treadle 295 is in its up position in which the switch arm 192 is in contact with switch terminal 191. Accordingly, the solenoids 186 are energized to retract their plungers 187 from the path of the blades on the track, but the solenoids 176 are deenergized and their plungers 177 accordingly extend into their operating position indicated in dotted lines in Fig. 5.

As the blades travel down the track, the first blade to reach the plungers 177 will be stopped thereby substantially directly below the axis of the spindle 181 when the spindle is positioned at the inner ends of the slot portions 182 in bracket arms 180. As additional blades successively travel down the track, they will be stopped in abutting contact as indicated in Fig. 6, and this operation in continued until the blades are stacked up in abutting relation over the entire length of track between stops 175 and 185. Next, the spindle 181 of fixture 13 is moved from the slot portions 183 to the inner ends of the slot portions 182. In this position the fixture will be lower than when supported in slot portions 183, and it is adjusted by the operator so that a pair of slots 231 in the disks 230 receive the uppermost edge 82 of the end blade 80. It will also be seen that the blades stacked behind this first blade are in substantially the same relative spacing as when they are assembled in the finished wheel.

The operator then depresses the treadle 195, thus energizing the solenoids 176 and causing retraction of their plungers 177. At the same time, this will cause deenergization of solenoids 186, with resultant projection of their plungers 187 into the path of blades on the track. In the initial adjustment of the apparatus, the stops 175 and 185 will be so spaced that the distance between their plungers 177 and 187 will accommodate the proper number of blades for the particular size of fixture being used. Accordingly, when the plungers 187 extend into operating position, they will segregate between themselves and the stops 175 the proper number of blades to be picked up, and they will hold back the remaining blades on the track.

As soon as stops 175 are thus released, the stacked blades on the track will begin to move forward. Simultaneously the operator rotates the fixture on its spindle so that the peripheries of disks 230 travel at substantially the same rate as the blades on the track, which results in bringing successive slots 231 into register with the successive blades on the track. The operator maintains sufficient downward pressure on the fixture to assure that the tension of springs 250 will be overcome to provide for entry of each blade into the slots, and at the same time he moves the fixture and spindle towards the outer ends of slot portions 182 to enable the flanged ends of blades 80 to clear the overhanging portions 104 of track rails 103. Accordingly, the blades will be successively picked up from the track as indicated in Fig. 6, this operation consuming only approximately as much time as required for the last blade picked up to travel from stop 185 to the assembly station. This operation is continued until all the slots are filled, and it will be noted that slot portions 182 are of sufficient length to provide clearance between the track rails 103 and the first blade picked up while the last one or two blades are being picked up. In the meantime, since additional blades will be formed and delivered to the track during the assembling operation at the assembly station, enough blades may accumulate to reach back on the track to the safety switch 200, and if this happens, further operation of the forming mechanism at the press will be suspended as already described.

After the fixture has been entirely filled with blades, the operator may withdraw its spindle from the slot portions 182 up the inclined slot portions 182a to the slot portions 183, where it is is manually rotated and checked to see that all the blades are firmly seated in the slots 231. The filled fixture is then transferred to the spinning device 15 for application of the end rings as already described. In the meantime, the operator raises treadle 195 to reverse operation of the stops 175 and 185. When the solenoids 186 are energized, their plungers 187 are retracted and the accumulated blades travel along the track until they reach the stop plungers 177, this particular stage of the operation being shown in Fig. 4. Also, if the stop 200 has been actuated during the previous assembling cycle, it will be released as soon as the accumulated blades move away from it as shown in Fig. 4. The operation of the entire apparatus is thus substantially continuous, with one fixture being filled with blades at the assembling station of the track while the fixture filled in the previous assembling cycle has end rings applied to the blades as described in connection with the spinning device, and this apparatus and method also provide for such continuous operation with minimum handling and necessity for manual control other than the simple rotation of the fixture during the actual pickup operation and the manual transfer of the filled fixture to and from the spinning unit.

Reference is made to copending application, Serial No. 34,334, filed June 21, 1948, as a division of this application.

While the forms of apparatus and method herein described constitute preferred embodiments of the invention, it is to be understood that the invention is not limited to these precise forms of apparatus and method and that changes may be made therein without departing from the scope of the invention which is defined in the appended claims.

What is claimed is:

1. Apparatus for fabricating a blower wheel having therein a predetermined number of individually formed blower blades arranged in angularly spaced circumferential alignment about a central axis and each having an edge of the working face thereof adapted to lie innermost in the finished wheel and including flanges at the opposite ends thereof adapted to extend generally radially of the finished wheel, comprising a work station including a fixture for assembling and holding said predetermined number of said blades in said spaced circumferential alignment, periodically operable forming means for successively forming said blades from sheet stock, said forming means being constructed and arranged to form each said blade with said working face lying downwardly and with said flanges thereon projecting upwardly, means for conveying successive said blades from said forming means to said work station, delivering means connecting said forming means with said conveying means, means on said delivering means for causing each said blade to rotate through a sufficient arc to be deposited on said conveying means with said edge thereof uppermost and with said flanges thereon extending downwardly, means on said conveying means receivable between said flanges on said blades for maintaining and guiding said blades in parallel relation along said conveying means, means at said work station for mounting said fixture for rotation above said conveying means, and said fixture including portions for frictionally gripping and removing each successive advancing blade from said conveying means in said spaced circumferential alignment upon rotation of said fixture in the same general direction with said conveying means.

2. Apparatus for fabricating a blower wheel having therein a predetermined number of individually formed blower blades arranged in angularly spaced circumferential alignment about a central axis and each having an edge of the working face thereof adapted to lie innermost in the finished wheel and including flanges at the opposite ends thereof adapted to extend generally radially of the finished wheel, comprising a work station including a fixture for assembling and holding said predetermined number of said blades in said spaced circumferential alignment, periodically operable forming means for successively forming said blades from sheet stock said forming means being constructed and arranged to form each said blade with said working face lying downwardly and with said flanges thereon projecting upwardly, means located below the level of said forming means for conveying successive said blades therefrom to said work station, an inclined slide for delivering said successive blades from said forming means to said conveying means, means on said slide cooperating with said flanges on said blades to guide said blades in parallel relation along said slide and to cause each said blade to rotate through a sufficient arc to be deposited on said conveying means with said edge thereof uppermost and with said flanges thereon extending downwardly, means on said conveying means receivable between said flanges on said blades for maintaining and guiding said blades in parallel relation along said conveying means, means at said work station for mounting said fixture for rotation above said conveying means, and said fixture including portions for frictionally gripping and removing each successive advancing blade from said conveying means in said spaced circumferential alignment upon rotation of said fixture in the same general direction with said conveying means.

3. Apparatus for fabricating a blower wheel having therein a predetermined number of individually formed blower blades arranged in angularly spaced circumferential alignment about a central axis and each having an edge of the working face thereof adapted to lie innermost in the finished wheel and including flanges at the opposite ends thereof adapted to extend circumferentially of the finished wheel in substantially abutting relation, comprising a work station including a fixture having friction means resiliently yieldable upon relative movement of said blades radially inwardly of said fixture to receive and grip said predetermined number of said blades in the same said circumferential alignment occupied thereby in the finished wheel, means for stacking said predetermined number of individually formed blades adjacent said work station with said edges thereof lying outermost and with said flanges thereon in abutting relation to locate said blades in substantially the same relative spacing as in the finished wheel, and means at said work station for mounting said fixture for rotation with respect to said stacking means in intermeshing relation with successive said stacked blades to cause said fixture to grip and pick up each successive said blade while maintaining said alignment thereof.

4. Apparatus for fabricating a blower wheel having therein a predetermined number of individually formed blower blades arranged in angularly spaced circumferential alignment about a central axis and each having an edge of the working face thereof adapted to lie innermost in the finished wheel and including flanges at the opposite ends thereof adapted to extend circumferentially of the finished wheel in substantially abutting relation, comprising a work station including a fixture having friction means resiliently yieldable upon relative movement of said blades radially inwardly of said fixture to receive and grip said predetermined number of said blades in the same said circumferential alignment occupied thereby in the finished wheel, means for conveying said blades to said work station, means for delivering to said conveying means said predetermined number of individually formed blades with said edges thereof lying uppermost, means for stacking said blades on said conveying means with said flanges thereon in abutting relation to locate said blades in substantially the same relative spacing as in the finished wheel, and means at said work station for mounting said fixture for rotation above said conveying means in predetermined spaced relation with said conveying means establishing said fixture in intermeshing relation with successive said blades on said conveying means to cause said fixture to grip and remove each successive advancing blade from said conveying means upon rotation of said fixture in the same general direction with said conveying means.

5. Apparatus for fabricating a blower wheel having therein a predetermined number of individually formed blower blades arranged in angularly spaced circumferential alignment about a central axis, comprising means for conveying a plurality of successive said blades to a work station, a fixture at said work station for assembling and holding said blades in substantially the same said circumferential alignment occupied thereby in the finished wheel, said fixture including friction means resiliently yieldable upon relative movement of said blades radially inwardly of said fixture to receive and grip said blades in said circumferential alignment, and means for mounting said fixture for rotation with respect to said conveying means at said work station in spaced relation with said conveying means such that successive advancing blades on said conveying means are pressed into gripped relation with said friction means upon rotation of said fixture in the same general direction with said conveying means causing said fixture to lift and hold successive said blades until the entire said predetermined number of blades are held therein in said circumferential alignment.

6. Apparatus for fabricating a blower wheel having therein a predetermined number of individually formed blower blades arranged in angularly spaced circumferential alignment about a central axis with one edge of each thereof lying innermost, comprising means for conveying a plurality of successive said blades to a work station with said edge of each said blade uppermost, a fixture proportioned to receive and hold said predetermined number of blades and including friction means resiliently yieldable upon relative movement of said blades radially inwardly thereof to receive and grip said predetermined number of blades in the same circumferential alignment as in the finished wheel, and means for mounting said fixture for rotation above said conveying means about an axis substantially parallel with said blade edges and with said fixture in such spaced relation with said conveying means that successive said blades advancing on said conveying means are pressed into gripped relation with said friction means causing said fixture to lift and hold successive said blades until the entire predetermined number of blades are held in said fixture in said circumferential alignment.

7. Apparatus for fabricating a blower wheel having therein a predetermined number of individually formed blower blades arranged in angularly spaced circumferential alignment about a central axis and each having an edge adapted to lie innermost in the finished wheel and including flange portions at the opposite ends thereof extending generally radially outwardly of the finished wheel, comprising a fixture for assembling and holding said predetermined number of said blades in said spaced circumferential alignment about said axis, means for conveying a plurality of successive said blades to said fixture, said conveying means including portions cooperating with said flange portions of said blades to maintain and guide said blades in parallel relation along said conveying means and with said edges thereof uppermost, said fixture including friction means resiliently yieldable upon relative movement of said blades radially inwardly thereof, means for mounting said fixture for rotation about said axis in the same general direction as said conveying means and with said axis parallel to said blades, and means for adjusting said mounting means to establish said rotating fixture in predetermined spaced relation with said conveying means causing said rotating fixture to intermesh with successive said blades on said conveying means to grip and remove said successive blades from said conveying means until the entire said predetermined number of blades are held in said fixture in said circumferential alignment.

8. Apparatus for fabricating a blower wheel having therein a predetermined number of individually formed blower blades arranged in angularly spaced circumferential alignment about a central axis with one edge of each thereof lying radially innermost and each having flange portions projecting radially outwardly at the opposite ends thereof, comprising a fixture for assembling and holding said predetermined number of said blades in said spaced circumferential alignment with said edges thereof radially innermost and with said flanges thereon projecting radially outwardly, means for conveying a plurality of successive said blades to said fixture, said fixture including friction means resiliently yieldable upon relative movement of said blades radially inwardly thereof to cause said fixture to grip and remove successive said blades from said conveying means upon rotation of said fixture in the same general direction as said conveying means, and said conveying means including portions arranged to receive said flange portions of said blades in overlapping relation with the sides thereof to support and guide said blades with said edge of each said blade in position for ready engagement with said gripping and removing portions of said fixture.

CARL E. WILKEN.
LYLE L. McGLADREY.

References Cited in the file of this patent

UNITED STATES PATENTS

| Number | Name | Date |
|---|---|---|
| 864,493 | Swift | Aug. 27, 1907 |
| 1,899,325 | Hardman et al. | Feb. 28, 1933 |
| 1,953,300 | Holman | Apr. 3, 1934 |
| 1,979,434 | Baker et al. | Nov. 6, 1934 |
| 2,052,840 | Nussbaum | Sept. 1, 1936 |
| 2,155,264 | Freed | Apr. 18, 1939 |
| 2,216,733 | Brucker | Oct. 8, 1940 |
| 2,290,381 | Poole et al. | July 21, 1942 |
| 2,302,095 | Bartch | Nov. 17, 1942 |
| 2,327,352 | Hoover | Aug. 24, 1943 |
| 2,360,383 | Zeidler | Oct. 17, 1944 |
| 2,556,122 | Thompson | June 5, 1951 |